(12) United States Patent
Horst

(10) Patent No.: US 8,994,244 B2
(45) Date of Patent: Mar. 31, 2015

(54) MOTOR STATOR WITH REDUCED COIL CONFIGURATION

(75) Inventor: Gary E. Horst, Manchester, MO (US)

(73) Assignee: Nidec Motor Corporation, St. Louis, MO (US)

( * ) Notice: Subject to any disclaimer, the term of this patent is extended or adjusted under 35 U.S.C. 154(b) by 351 days.

(21) Appl. No.: 13/563,951

(22) Filed: Aug. 1, 2012

(65) Prior Publication Data

US 2014/0035418 A1    Feb. 6, 2014

(51) Int. Cl.
| | |
|---|---|
| *H02K 1/12* | (2006.01) |
| *H02K 1/14* | (2006.01) |
| *H02K 1/18* | (2006.01) |
| *H02K 21/16* | (2006.01) |
| *H02K 21/22* | (2006.01) |

(52) U.S. Cl.
CPC ............... *H02K 1/148* (2013.01); *H02K 1/185* (2013.01); *H02K 1/187* (2013.01); *H02K 21/16* (2013.01); *H02K 21/222* (2013.01)
USPC ...................................................... 310/254.1

(58) Field of Classification Search
USPC ...................................................... 310/254.1
See application file for complete search history.

(56) References Cited

U.S. PATENT DOCUMENTS

| | | | |
|---|---|---|---|
| 4,990,809 A | 2/1991 | Artus et al. | |
| 6,727,632 B2 | 4/2004 | Kusase | |
| 6,949,864 B2 * | 9/2005 | Maslov et al. | 310/254.1 |
| 6,992,419 B2 | 1/2006 | Kim et al. | |
| 6,998,757 B2 | 2/2006 | Seguchi et al. | |
| 7,154,192 B2 * | 12/2006 | Jansen et al. | 290/55 |
| 7,356,906 B2 | 4/2008 | Kim et al. | |
| 7,443,074 B2 | 10/2008 | Kim et al. | |
| 7,626,299 B2 | 12/2009 | Yoshikawa et al. | |
| 7,635,932 B2 * | 12/2009 | Matin et al. | 310/58 |
| 7,652,406 B2 | 1/2010 | Kim et al. | |
| 8,816,554 B2 * | 8/2014 | Li et al. | 310/114 |
| 2002/0047418 A1 * | 4/2002 | Seguchi et al. | 310/114 |
| 2010/0156216 A1 | 6/2010 | Lee et al. | |
| 2010/0156231 A1 | 6/2010 | Lee et al. | |
| 2011/0140567 A1 | 6/2011 | Horst et al. | |
| 2011/0316365 A1 | 12/2011 | Kim | |

* cited by examiner

*Primary Examiner* — Hanh Nguyen
(74) *Attorney, Agent, or Firm* — Hovey Williams LLP

(57) ABSTRACT

A motor is provided for use in a machine. The motor includes a segmented stator comprising magnetically isolated core segments.

37 Claims, 20 Drawing Sheets

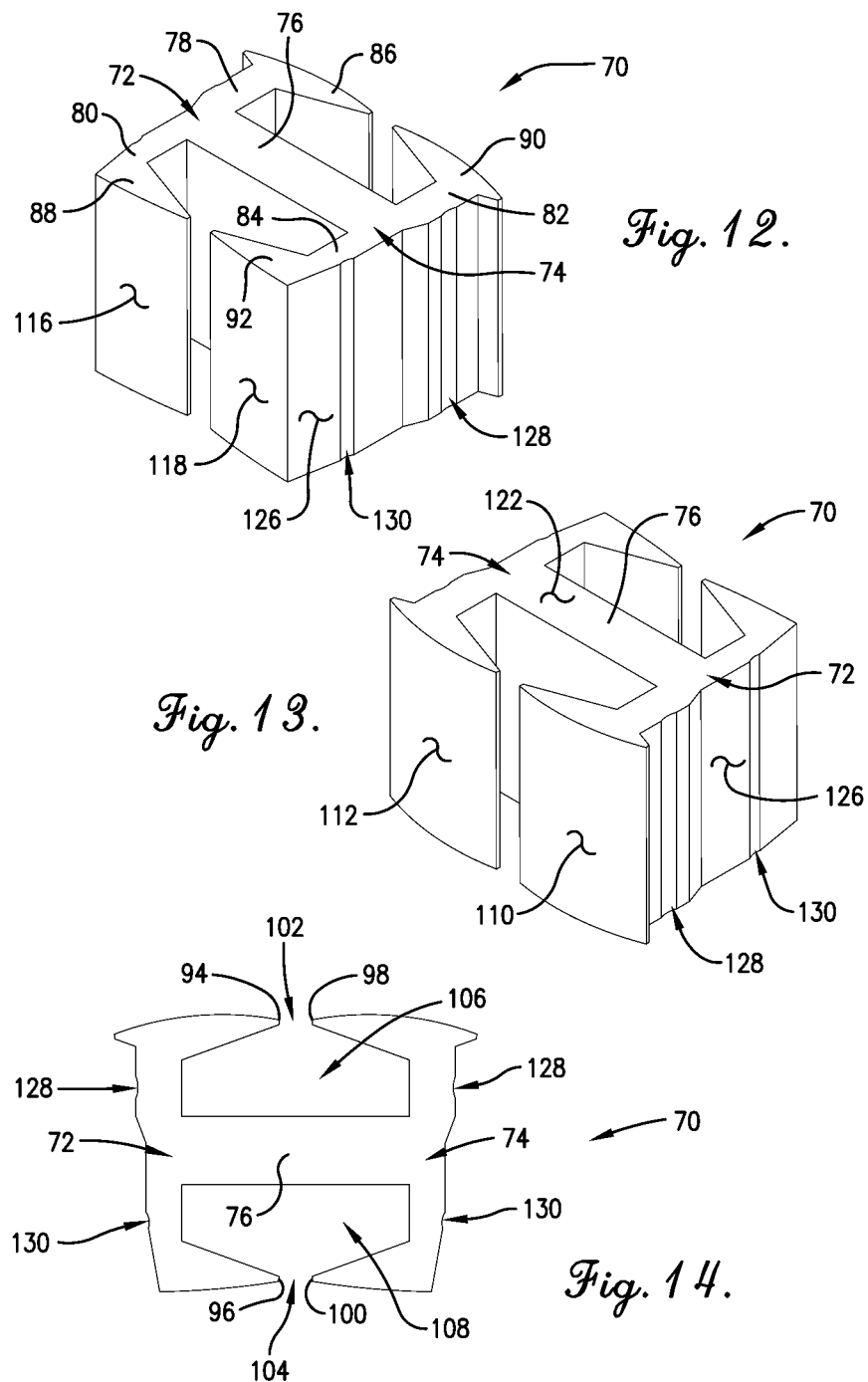

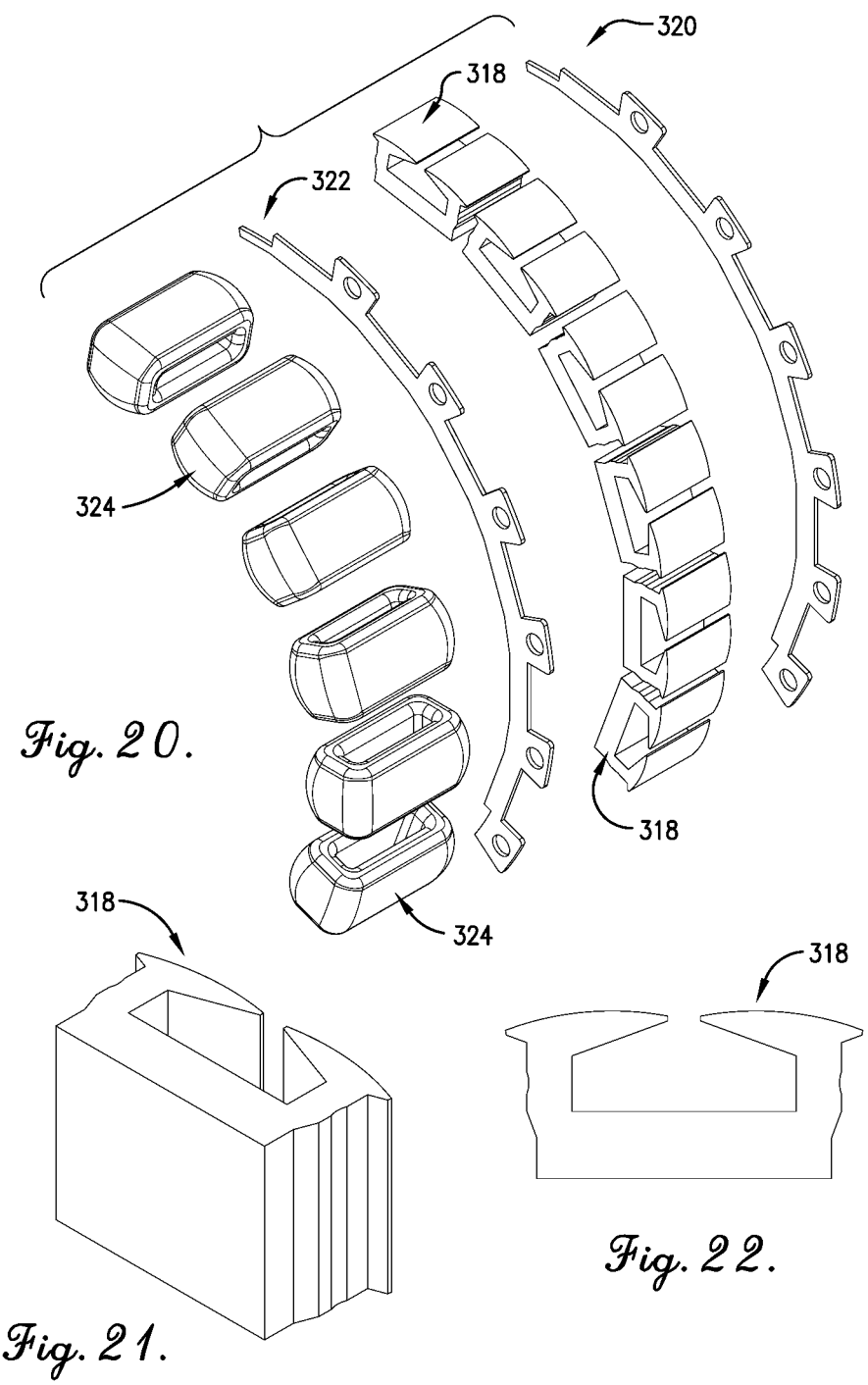

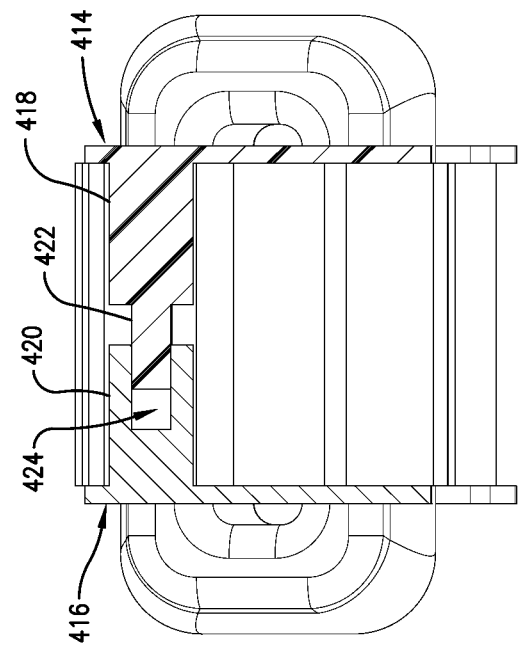
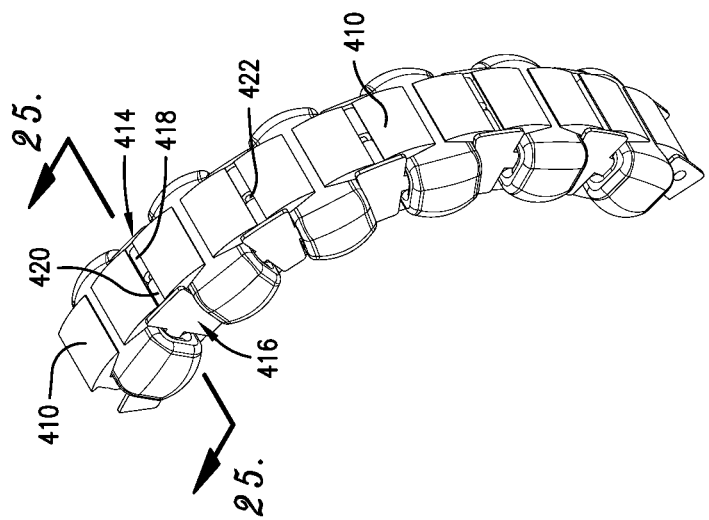

US 8,994,244 B2

MOTOR STATOR WITH REDUCED COIL CONFIGURATION

BACKGROUND OF THE INVENTION

1. Field of the Invention

The present invention relates generally to an electric motor for use in a machine. More specifically, the present invention concerns an electric motor having a segmented stator comprising magnetically isolated core segments.

2. Discussion of the Prior Art

Those of ordinary skill in the art will appreciate that electric motors are often used in home appliances such as dishwashers and washing machines. In a washing machine, for instance, an electric motor may be used to cause rotation of the washer basket to agitate the clothing contained therein. Although a variety of motor component arrangements may be used, one known embodiment of an electric motor includes a stator positioned at least in part radially inside a rotor. An electric motor having such a configuration is commonly referred to as an outer rotor motor or external rotor motor, although other names may be used. In another known embodiment, often but not exclusively referred to as an inner rotor motor, a motor is provided in which a stator is positioned at least in part radially outside a rotor. In yet another known embodiment, a motor is provided in which a stator is positioned at least in part radially between rotor components such that inner and outer circumferential air gaps are formed between the rotor and the stator. Among other things, such a motor may be referred to as a dual air gap motor or dual rotor motor. In the case of a washing machine having an electric motor of any of the types described above, the rotor is typically coupled to the washer basket, whereas the stator is fixed to a tub mounting hub that is coupled to a stationary washer outer tub. To avoid potential electrical shock of the user, the stator is mounted in such a manner that it is electrically isolated from the tub.

The stator of an electric motor typically includes a core and a plurality of coils. Conventionally, the core takes a generally toroidal form and is composed of a ferromagnetic metal such as iron or steel. The coils of the stator are typically formed by the winding of electrically conductive wire multiple times around the core. Electrical insulation is typically provided between the core and the coils.

SUMMARY

According to one aspect of the present invention, a segmented stator for use in a motor is provided. The stator comprises a core and wiring. The core comprises a plurality of arcuately arranged, magnetically isolated segments. The wiring is wound around each of the segments. Each of the segments includes a pair of spaced apart, generally radial arms and a yoke extending between and interconnecting the arms.

According to another aspect of the present invention, a motor for use in a machine is provided. The motor comprises a rotor and a segmented stator. The rotor is rotatable about an axis. The stator includes a core and wiring. The core comprises a plurality of arcuately arranged, magnetically isolated segments. The wiring is wound around each of the segments. Each of the segments includes a pair of spaced apart, generally radial arms and a yoke extending between and interconnecting the arms.

Among other things, the provision of toroidal winding about a yoke extending between and connecting the generally radial arms of each of the magnetically isolated stator segments enables increased flux per coil.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 12 is an enlarged inner radial top perspective view of a segment of the stator of FIGS. 1-3 and 7-11;

FIG. 13 is an outer radial top perspective view of the stator segment of FIG. 12;

FIG. 14 is a top view of the stator segment of FIGS. 12 and 13;

FIG. 20 is an exploded side perspective view of one of the arcuate sections of the stator of FIGS. 18 and 19, particularly illustrating the relationship between the segments, the frames, and the coils;

FIG. 21 is an enlarged inner radial top perspective view of a segment of the stator of FIGS. 18-20;

FIG. 22 is a top view of the stator segment of FIG. 21;

FIG. 24 is an enlarged side perspective view of one of the arcuate sections that collectively form the stator of FIG. 23;

FIG. 25 is a circumferential, elevational view of a portion of the arcuate section of FIG. 24, particularly illustrating the interengagement of the positioning pegs and projections.

Figure 1:
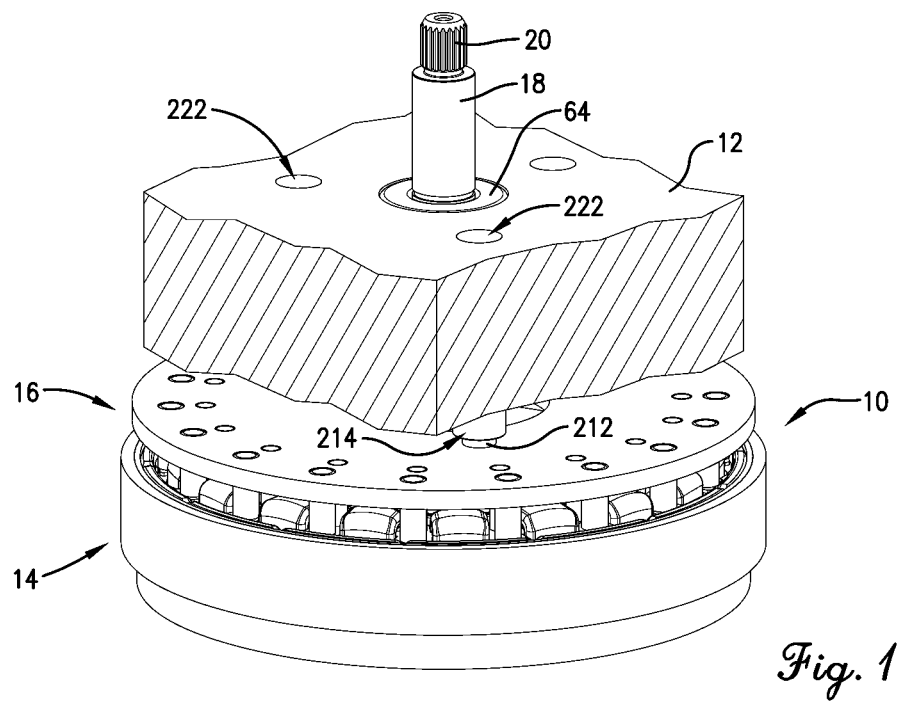
FIG. 1 is a partial sectional top view of a portion of a machine and a motor constructed in accordance with the principles of a first embodiment of the present invention.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. Furthermore, although an exhaustive description is not provided herein of the numerous embodiments which might be made through the combination of features selected from the embodiments described below, such hybrid or combined embodiments fall entirely within the scope of the present invention.

Figure 2:
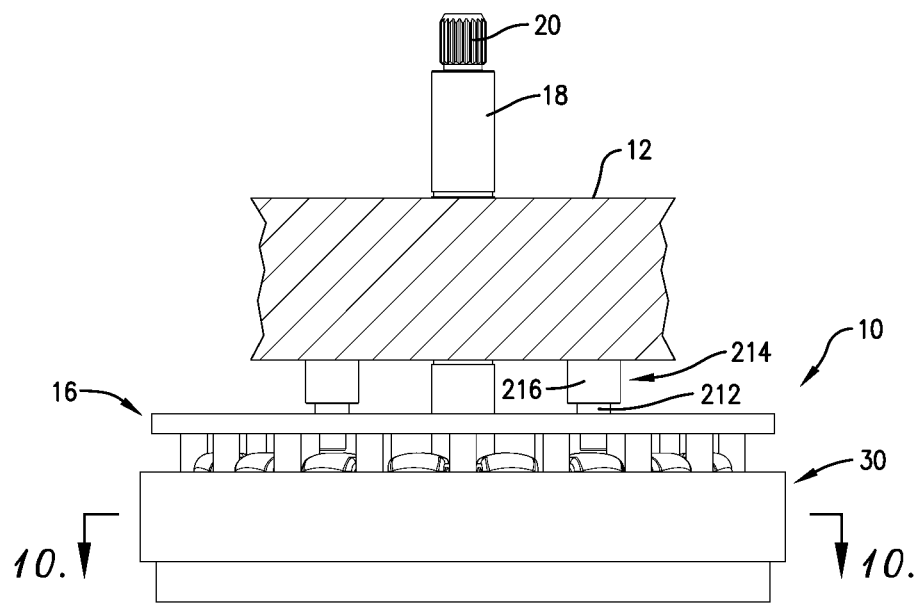
FIG. 2 is a partial sectional side view of the portion of a machine and the motor of FIG. 1.
Figure 3:
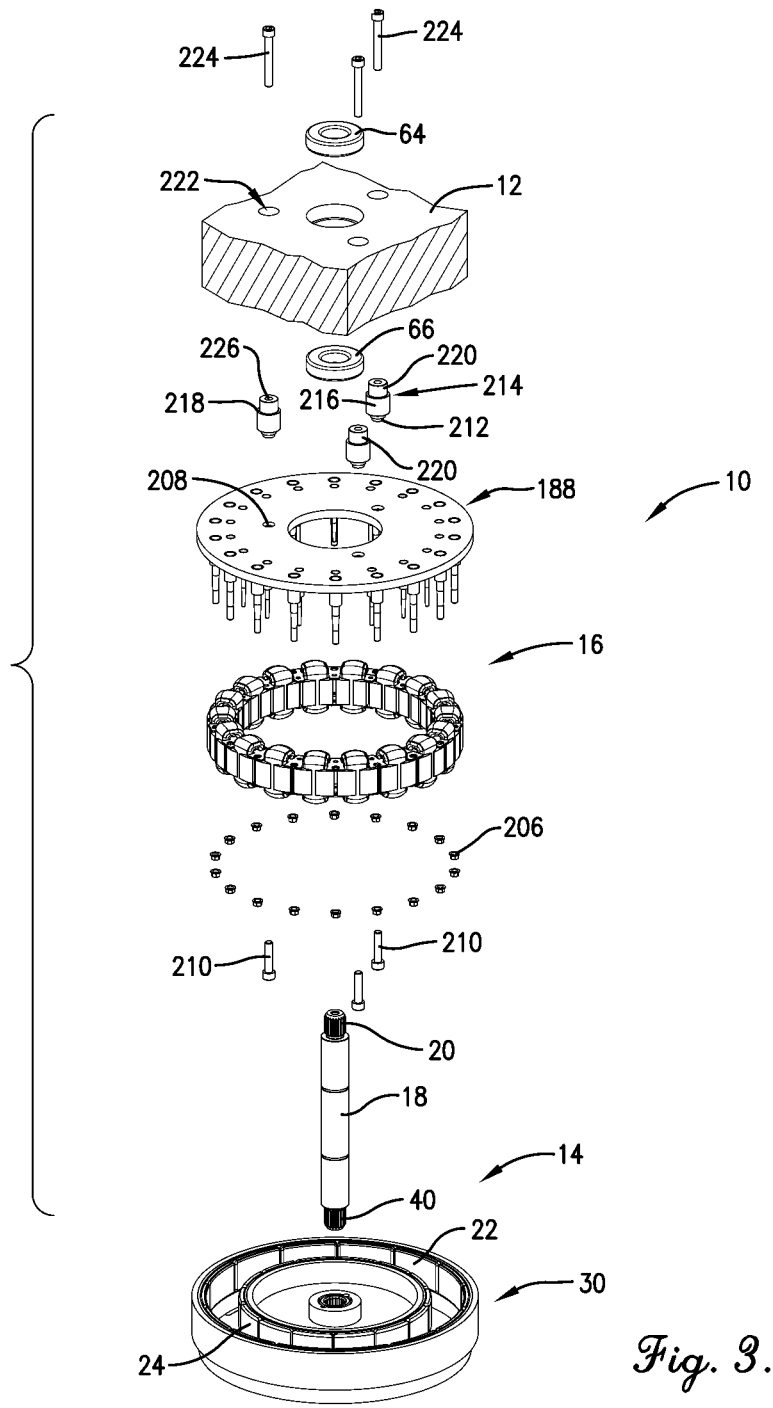
FIG. 3 is an exploded, partial sectional top perspective view of the portion of a machine and motor of FIGS. 1 and 2, particularly illustrating the mounting and assembly structures.

With initial reference to FIGS. 1-3, a motor 10 constructed in accordance with a first preferred embodiment of the present invention is depicted for use in a machine having a mounting region 12. The machine may suitably be one of a variety of types, including but not limited to washing machines, fans, generators, and exercise equipment such as bicycles.

As best shown in FIGS. 1-3, the motor 10 is preferably a dual rotor motor that broadly includes a rotor 14 and a stator 16. As will be described, in this embodiment, the stator 16 is positioned between portions of the rotor 14 to define a pair of radially spaced apart, circumferentially extending air gaps.

With continued reference to FIGS. 1-3, the rotor 14 includes a rotatable shaft 18 connectable to the machine at a machine connection end 20. Preferably, the axis of rotation of the rotor 14 is coaxial with that of the rotatable shaft 18, with the shared axis further being coincident with the geometric center of the stator 16. It is permissible, however, for offset axes and/or centers to be defined.

Figure 4:
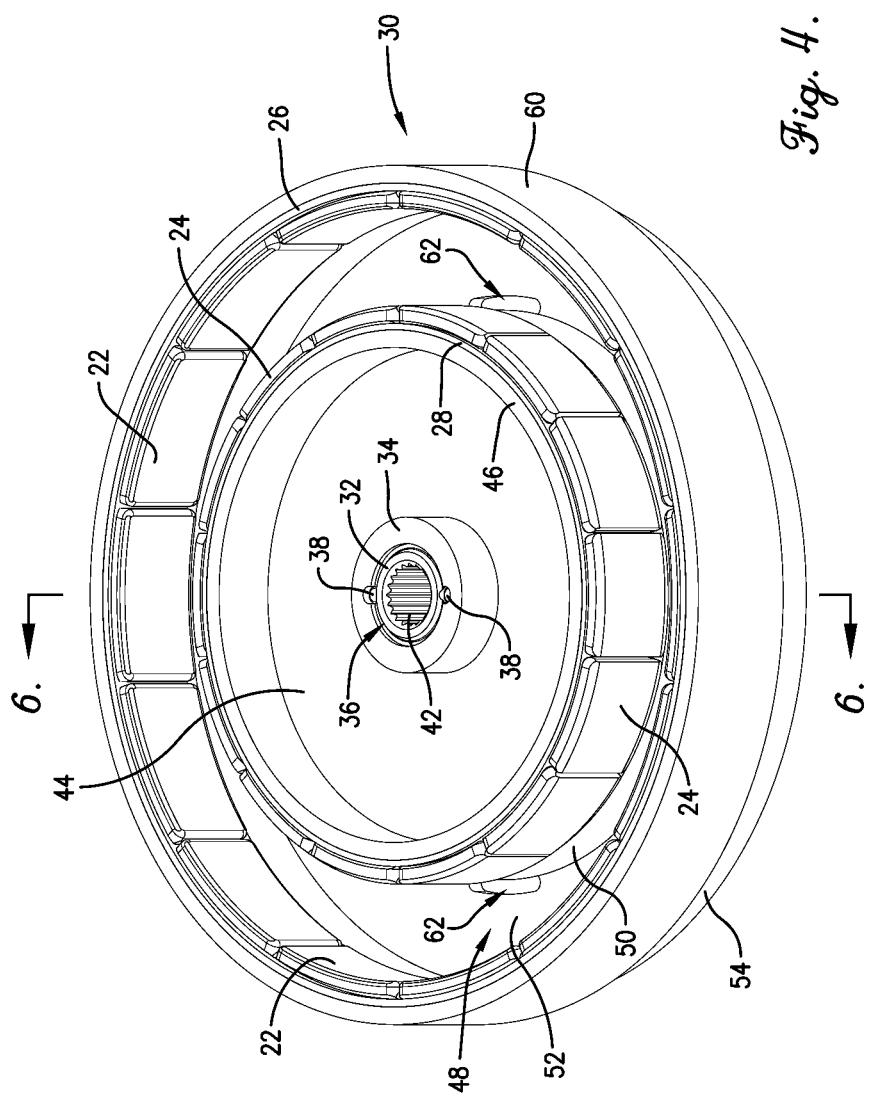
FIG. 4 is an enlarged top perspective view of a portion of the rotor of FIGS. 1-3.
Figure 6:
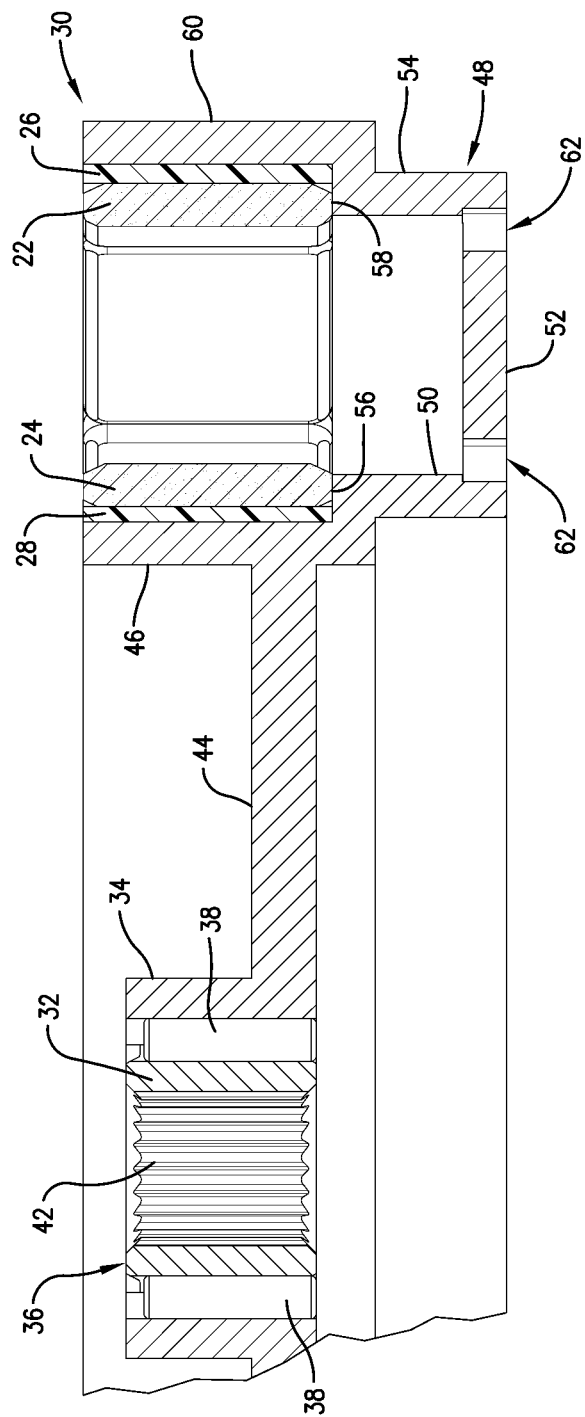
FIG. 6 is partial sectional view of the portion of the rotor shown in FIGS. 4 and 5.
Figure 10:
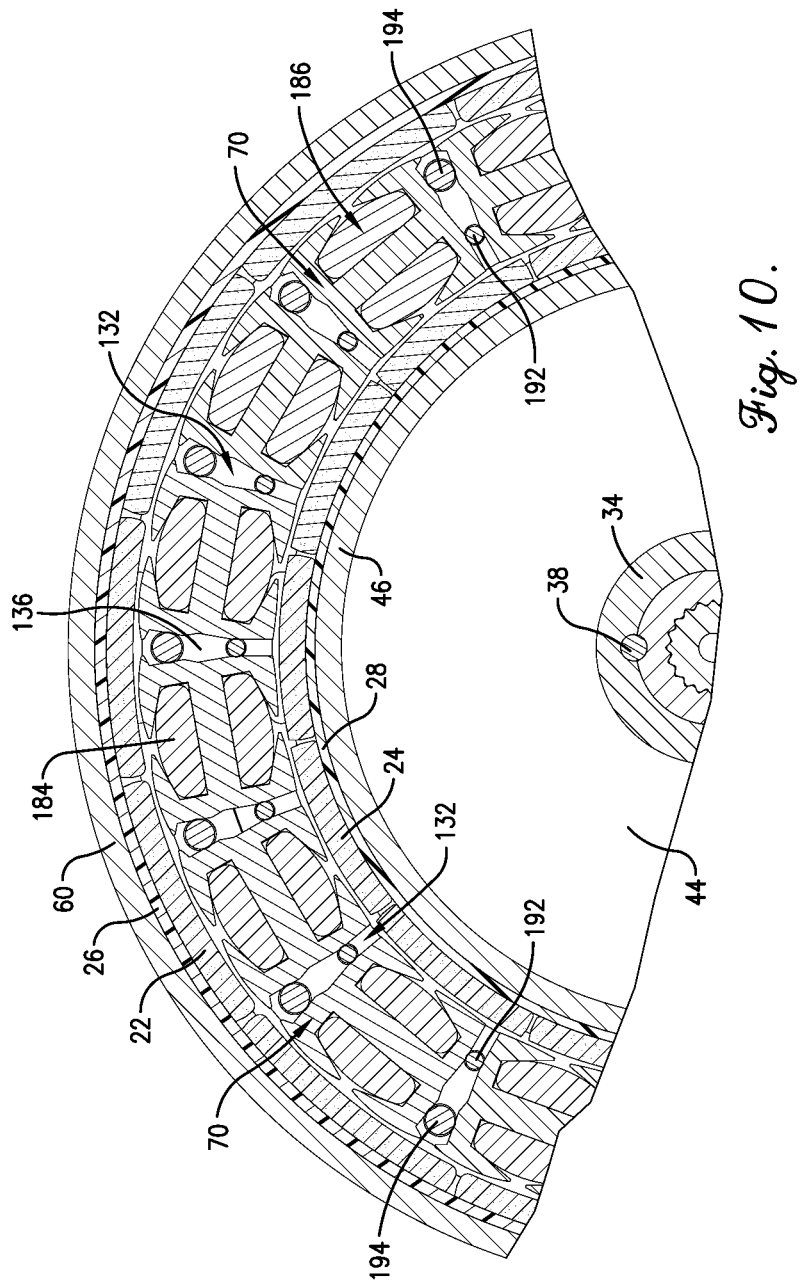
FIG. 10 is a fragmentary sectional top view of the stator and base plate assembly of FIGS. 7-9, particularly illustrating the relationship between the stator segments, the coils, the positioning pegs, and the permanent magnets of the rotor.

As best shown in FIGS. 4, 6, and 10, the rotor 14 also includes an outer plurality of arcuately spaced permanent magnets 22 and an inner plurality of arcuately spaced permanent magnets 24. An outer backing ring 26 is located radially outwardly from the outer magnets 22, and an inner backing ring 28 is located radially inwardly from the inner magnets 24. Preferably, each of the backing rings 26,28 comprises a sheet of metal wrapped five times around the appropriate circumference so that each of the backing rings 26,28 includes five layers. (For the sake of clarity, individual layers of the backing rings 26,28 are not shown.) Preferably, the metal comprises iron. However, backing rings comprising a different number of layers or a single layer and/or comprising one or more of a variety of materials fall within the scope of the present invention. According to some aspects of the present invention, it may be possible to remove the backing rings altogether.

Figure 5:
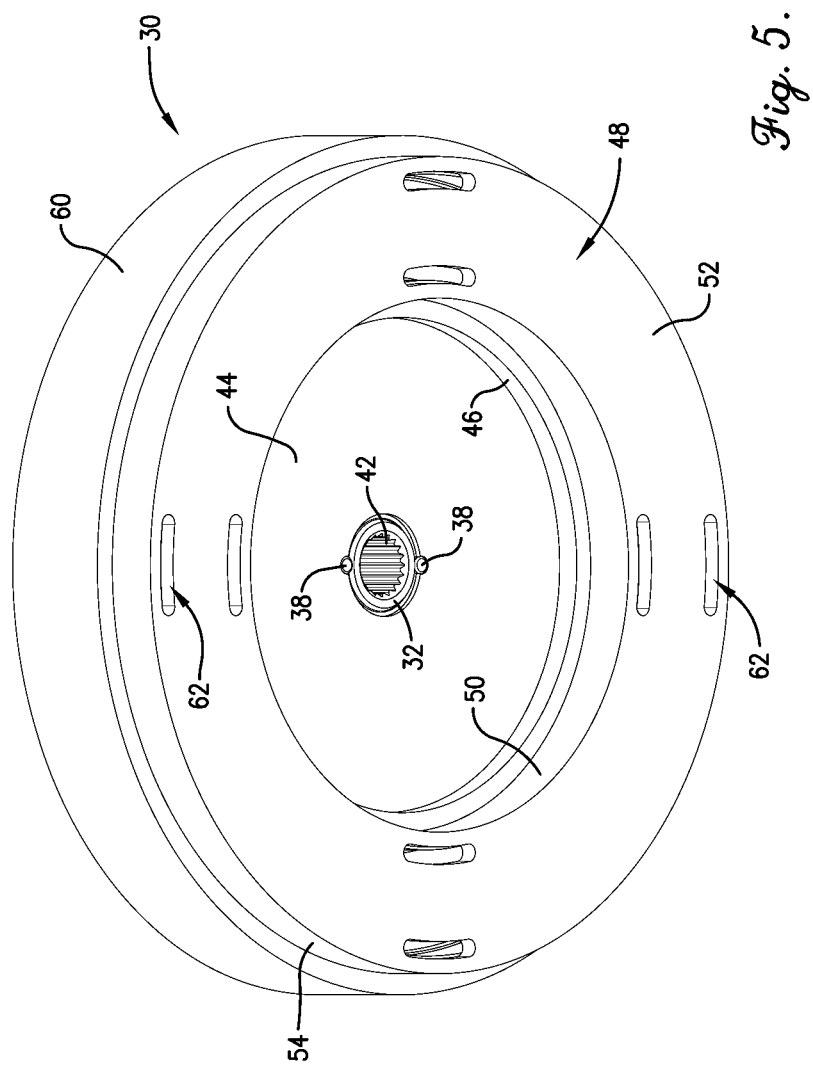
FIG. 5 is a bottom perspective view of the portion of the rotor shown in FIG. 4.

The backing rings 26,28 and magnets 22,24 are preferably positioned within and supported by a rotor can 30. The rotor can 30 connects to a central coupler 32 that connects to the shaft 18. As best shown in FIGS. 4-6, the rotor can 30 preferably includes a shaft support column 34 defining a central opening 36 into which the coupler 32 is inserted and secured by means of interference screws 38 to prevent relative rotation therebetween. However, a variety of means of rotationally fixing the can 30 and the coupler 32 to each other are permissible. For instance, the rotor can could be provided with a central opening having a splined inner circumferential surface that meshes with outer splines on the coupler.

The central coupler 32 is also fixed to the shaft 18 so that the shaft 18, the coupler 32, the rotor can 30, the backing rings 26,28, and the permanent magnets 22,24 all rotate together. In the illustrated embodiment, the shaft 18 has a splined end 40 that meshes with a plurality of inner splines 42 on the coupler 32, although other suitable means such as interference screws may be incorporated to rotationally fix the shaft 18 and the coupler 32 to each other.

Preferably, the rotor can 30 includes a central base wall 44 projecting radially from the support column 34 and a circumferentially extending inner support wall 46 that projects axially upwardly and downwardly from the base wall 44. An annular tray 48, comprising an inner tray wall 50, a base tray wall 52, and an outer tray wall 54, is preferably positioned below the base wall 44 and radially outside the inner support wall 46. The upper surface of the inner tray wall 50 defines an inner circumferential shelf 56 that extends radially outwardly from the inner support wall 46. Similarly, an outer circumferential shelf 58 is defined by the upper surface of the outer tray wall 54. The outer circumferential shelf 58 extends radially inwardly from a circumferentially extending outer support wall 60 that extends axially upwardly from the outer shelf 58. In the first preferred embodiment, the inner shelf 56 supports the inner backing ring 28 and the inner plurality of magnets 24, while the outer shelf 58 supports the outer backing ring 26 and the outer plurality of magnets 22.

The tray 48 preferably includes a plurality of ventilation apertures 62 for cooling of the stator 16 during and after operation of the motor 10. Also, although such a configuration is not illustrated, it is within the scope of the present invention for the rotor can to include a plurality of blades operable to disturb adjacent air when the rotor is in motion in order to further assist in cooling. Ultimately, any one of a variety of alternative rotor can configurations may be used without departing from the scope of the present invention.

The rotor can 30 is preferably formed of plastic, although the rotor can 30 may alternatively be formed of one or more of a variety of materials within the scope of the present invention. Furthermore, the rotor 14 is preferably rotationally supported on the mounting region 12 of the machine by a pair of bushings 64,66, although ball bearings or entirely different rotation isolation mechanisms could be used to similar effect without departing from the spirit of the present invention The stator 16 preferably includes a generally toroidal core 68 comprising a plurality of magnetically isolated segments 70 so as to minimize flux leakage between the segments. As used herein, the terms "magnetically isolated" and "magnetic isolation" should be interpreted as meaning that (1) the segments are spaced apart (with no magnetically conductive elements extending therebetween) or (2) that the flux flowing through an interconnecting magnetically conductive element extending between and connecting a pair of adjacent segments is no greater than about 10% of the maximum flux flowing through either one of the pair of segments when the motor is in operation. Under the definition of magnetically isolated, adjacent stator segments are spaced apart whenever a gap is formed between adjacent segments, even if the gap is partly occupied by any one or more of a variety of structures (which may or may not be magnetically conductive). It is only important in this specific arrangement that the structure not be in direct contact with the segments. Adjacent stator segments shall also be considered spaced apart (so as to be magnetically isolated) even when a structure extends between and connects the adjacent stator segments, as long as such an interconnecting structure is substantially not magnetically conductive (e.g., plastic, an insulated ferromagnetic material, etc.).

In the embodiment shown in FIGS. 7-14, magnetic isolation is effected through the segments 70 being arcuately spaced apart. As best shown in FIGS. 12-14, the segments 70 preferably each include a pair of spaced apart arms 72,74 and a substantially circumferentially extending yoke 76 that extends between and interconnects the arms 72,74. Preferably, each arm 72 includes outer and inner arm portions 78,80, respectively, extending from the yoke 76 in substantially opposite directions. Similarly, each arm 74 preferably includes outer and inner arm portions 82,84, respectively, extending from the yoke 76 in substantially opposite directions. Each segment 70 therefore preferably has an H-like form.

Although the yoke 76 and the arms 72,74 are preferably straight, it is also within the scope of the present invention for the yokes and/or arms to include gradual directional changes (e.g., curves), discrete directional changes (e.g., zig-zags or steps), or combinations of the above.

With continued reference to FIGS. 12-14, each arm portion 78,80,82,84 preferably includes at its end a respective crown 86,88,90,92 that extends toward the adjacent arm portion 78,80,82,84. However, it is with the scope of the present invention for each of the crowns 86,88,90,92 to extend in an alternative direction. For instance, each of the crowns 86,88, 90,92 could extend perpendicularly away from the adjacent arm portion 78,80,82,84.

Each crown 86,88,90,92 preferably presents a respective edge 94,96,98,100. The edges 94,98 define a first gap 102 therebetween, while the edges 96,100 define a second gap 104 therebetween. For each segment 70, the arm portions 78,82 (including the crowns 86,90) and the yoke 76 cooperatively define an outer wiring pathway 106; and the arm portions 80,84 (including the crowns 88,92) and the yoke 76 cooperatively define an inner wiring pathway 108.

The crowns 86,90 preferably include curved outermost segment surfaces 110,112, respectively, that cooperatively present a discontinuous radially outermost circumferential face 114 of the stator 16. The crowns 88,92 preferably include innermost segment surfaces 116,118 that cooperatively present a discontinuous radially innermost circumferential surface 120 of the stator 16.

Furthermore, each segment 70 preferably presents an upper face 122, a lower face 124, and two outer side faces 126. Each outer side face 126 preferably includes a pair of grooves 128,130, as will be discussed in greater detail below.

The segments 70 preferably comprise a ferromagnetic material such as steel and are preferably laminated structures. The laminations are preferably electrically insulated from each other in order to reduce the formation of electrical eddy currents flowing therebetween when the motor 10 is in operation. However, it is within the ambit of the invention for the segments 70 to comprise an alternative material and be of an alternative structure. For instance, each segment 70 could include non-insulated laminations, be integrally formed, be composed of iron, or feature a combination of these or other variations known to one skilled in the art.

Figure 15:
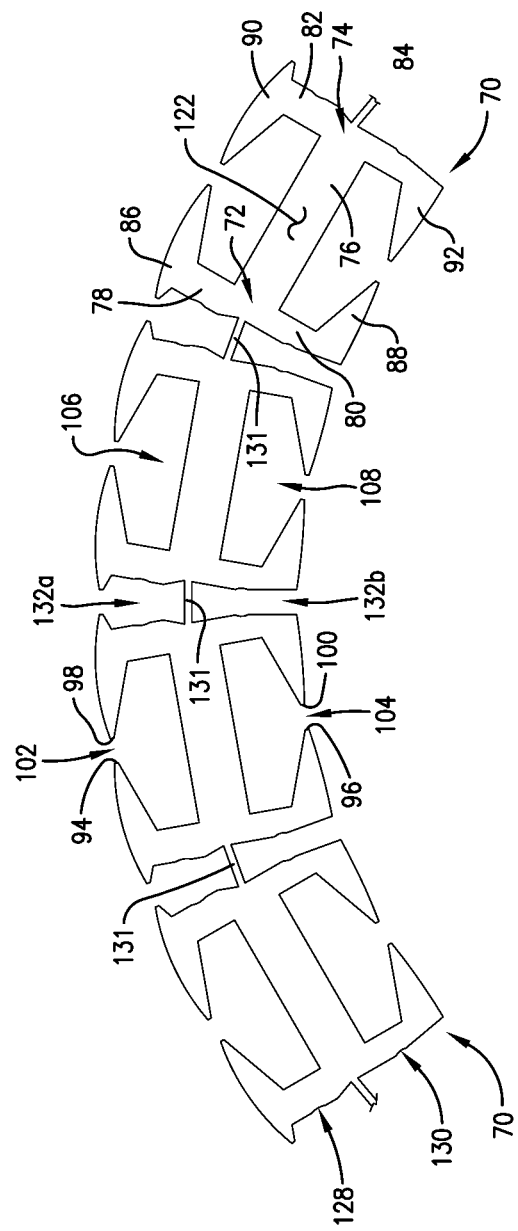
FIG. 15 is a top view of a plurality of stator segments and interconnecting bridges constructed in accordance with an alternative stator embodiment suitable for use in any one of a variety of motor embodiments that fall within the scope of the present invention.

It is also within the scope of the present invention for at least some of the stator segments 70 to be interconnected. As shown in FIG. 15, for instance, adjacent stator segments 70 may be connected to each other via an interconnecting element or bridge 131. In this embodiment, the bridge 131 is magnetically conductive (meaning the segments are not technically spaced apart). However, the bridge 131 and the segments 70 are dimensioned and configured so that the total flux passing between the adjacent segments 70 through the interconnecting bridge 131 is no greater than about 10% of the maximum flux flowing through either one of the pair of adjacent segments 70 when the motor is in operation. That is, although the adjacent segments 70 are interconnected, they are magnetically isolated according the definition above.

In the illustrated embodiment, each bridge 131 is integral with the adjacent segments 70. Such a configuration is particularly well suited for use with a laminated stator, for instance, in which the bridge is integrally formed and corresponds with one or more stator segment laminations. In such a case, provision of a bridge or bridges enables a simplified manufacturing approach and increased ease of handling. More particularly, in a preferred embodiment, multiple interconnected segment laminations and the corresponding bridge layer or layers can be punched from a given lamination sheet simultaneously, with the interconnected segment laminations being held in appropriate positions after punching by the bridge layer or layers. Upon assembly of the laminated stator, the segments themselves will likewise be held in appropriate positions by the bridge or bridges.

In a preferred embodiment, each bridge 131 extends between the corresponding segments 70 from the upper faces 122 to the lower faces 124. However, it is within the scope of the present invention for one or more of the bridges to extend along only a portion of the axial height of the corresponding segments or to be axially discontinuous. For instance, a bridge layer might be formed in every other lamination such that the bridge as a whole includes axial gaps; or a bridge might be formed from only the axially upper half of the stator laminations.

It is also within the ambit of the present invention for a radially or laterally multi-part bridge to be provided between a single pair of adjacent segments. For instance, rather than a single-part bridge extending between the respective middle regions of a pair of segments, as is shown in FIG. 15, a first bridge part could extend between the radially outer regions and a second bridge part could extend between the radially inner regions of the respective pair of segments.

Even further, it is within the scope of the present invention for interconnecting elements or bridges to be provided that are discrete from the corresponding segments. That is, the magnetically conductive interconnecting element could alternatively be formed separately from the segments. Such discrete interconnecting elements may comprise the same material as the corresponding segments or be of a different material. Furthermore, the discrete interconnecting elements may be positioned between the segments by any one or more of a variety of means, including but not limited to press-fits, dovetails, T-joints, adhesives, and welding.

Figure 7:
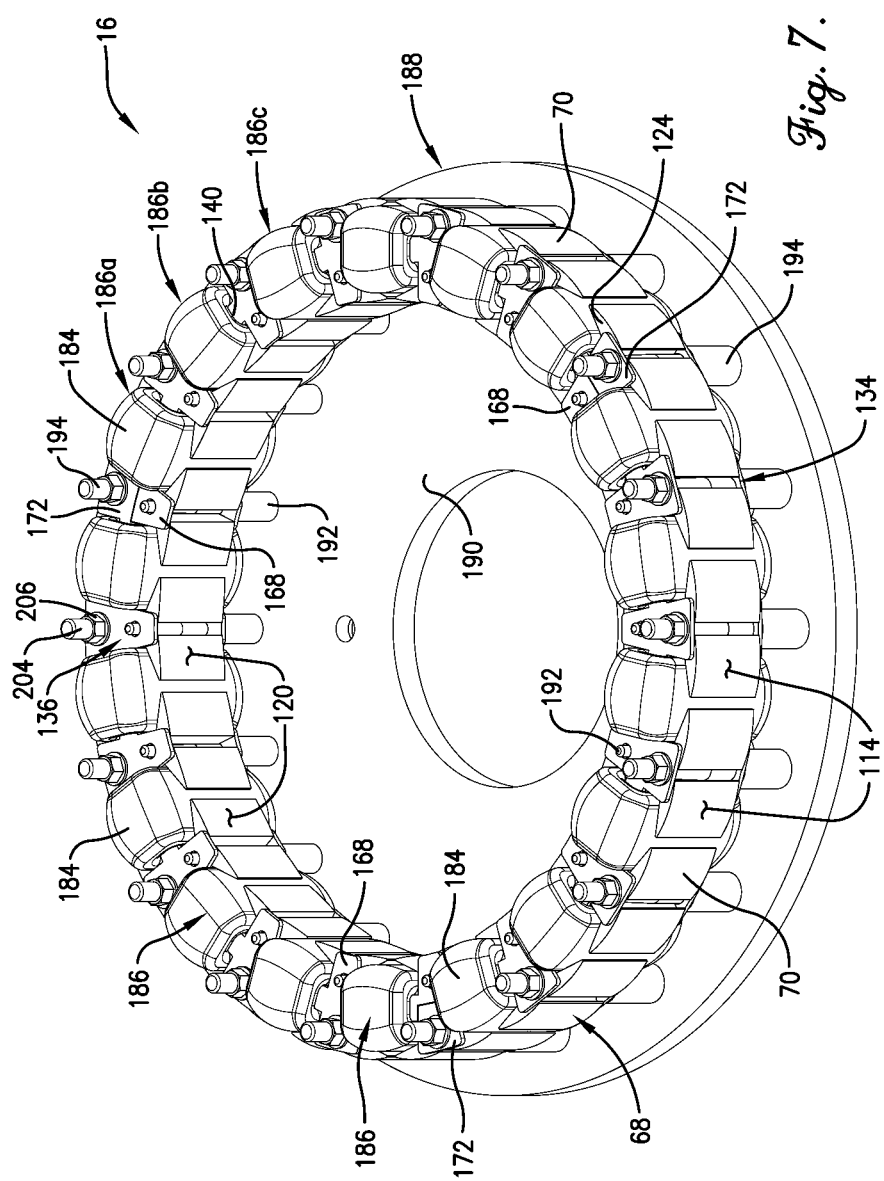
FIG. 7 is an enlarged bottom perspective view of an assembly comprising the stator and base plate of FIGS. 1-3.
Figure 8:
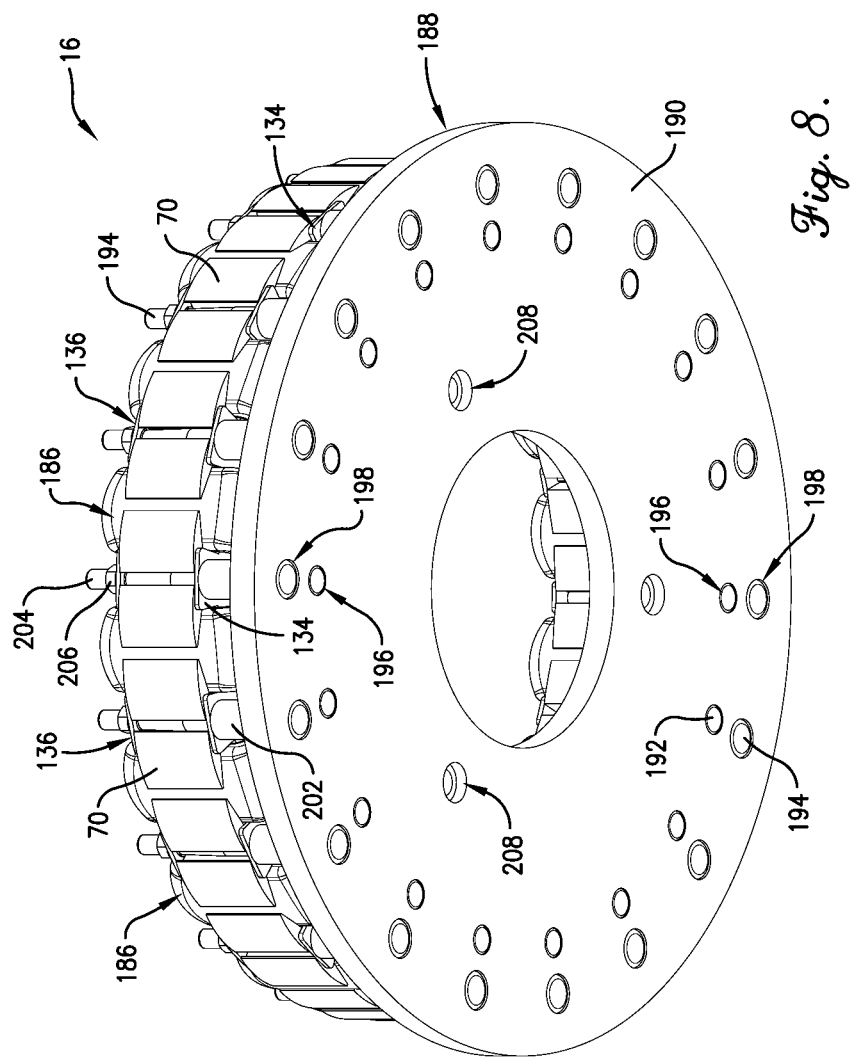
FIG. 8 is a top perspective view of the stator and base plate assembly of FIG. 7.

As shown in FIG. 7 and others, in the assembled stator 16, the segments 70 are arranged such that the core 68 takes a generally toroidal form. Although an annular core having generally circular inner and outer surfaces as shown falls under the descriptor "generally toroidal" as used herein, "generally toroidal" shall not be limited to the core shape described above but instead be interpreted to include any suitable shape having a central opening. According to certain aspects of the invention, for instance, the inner and/or outer surfaces could be polygonal in shape, with the rotor being adjusted accordingly as necessary.

Most preferably, each adjacent pair of segments 70 is spaced apart with an open, unobstructed space 132 being formed therebetween. In other cases, however, an obstruction may be present, while still maintaining the spaced apart relationship of the adjacent segments 70. For example, in one alternative embodiment, additional rigidity may be provided to the stator 16 by use of one or more retaining members (not shown) such as plastic inserts, non-stretchable adhesive tape, or stiff fibers. If desired, the retaining members may be positioned on or adjacent the outermost circumferential face 114 and/or the innermost circumferential surface 120 of the stator 16. Potential approaches of this sort are discussed in detail in U.S. Patent Publication No. 2011/0140567 to Horst et al., which is incorporated in its entirety by reference herein. It should be understood that such structures and techniques are generally applicable to each of the preferred embodiments disclosed herein, as well as to other embodiments that fall within the scope of the present invention but are not specifically addressed.

Figure 11:
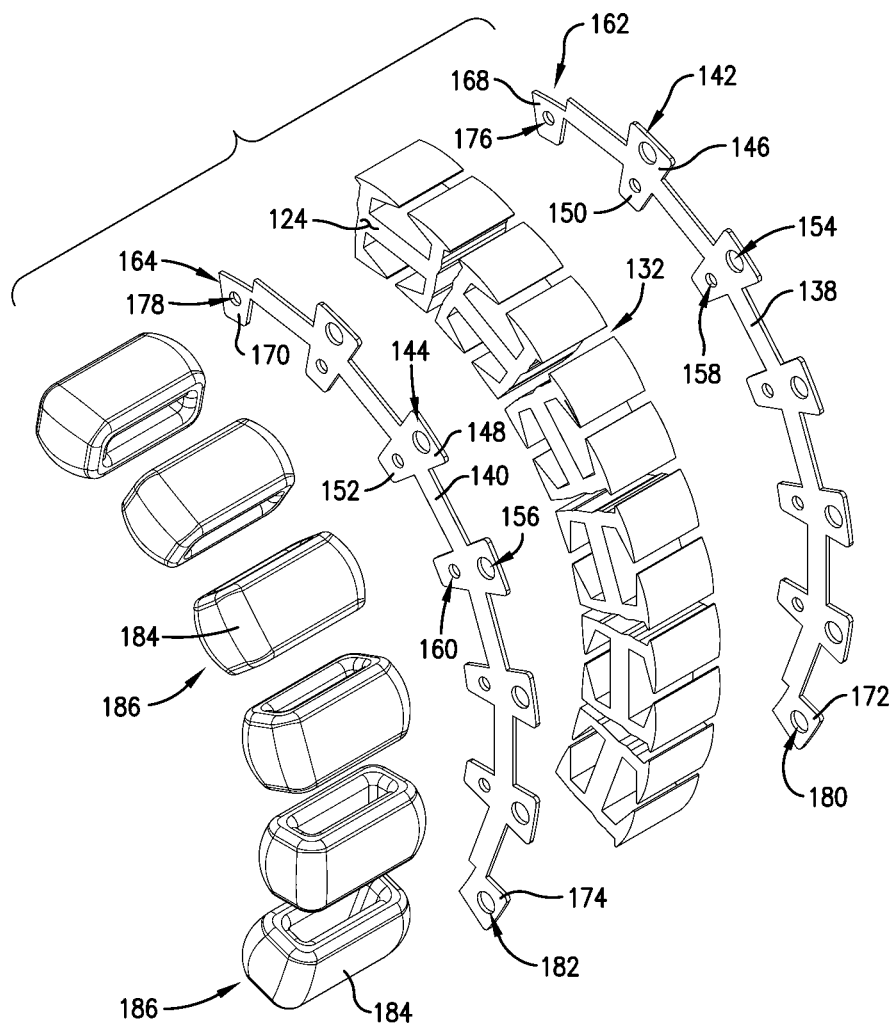
FIG. 11 is an exploded side perspective view of one of the arcuate sections shown in FIG. 9, particularly illustrating the relationship between the segments, the frames, and the coils.

In the first embodiment and as best illustrated in FIGS. 7 and 11, an upper frame 134 and a lower frame 136 are positioned adjacent the upper faces 122 and lower faces 124, respectively, of the stator segments 70 so as to at least partially cover the upper and lower faces 122,124. Each frame 134,136 preferably includes a respective circumferentially extending crossbar 138,140 that is positioned adjacent the yokes 76. Each frame 134,136 also preferably includes a respective plurality of arcuately arranged, radially projecting tabs 142,144 that span the spaces 132 between adjacent segments 70 and partly cover the arms 72,74 adjacent the respective spaces 132. Preferably, each tab 142,144 includes an outer segment 146,148 extending radially outwardly from the respective crossbar 138,140 and an inner segment 150,152 extending radially inwardly from the respective crossbar 138,140. Each tab 142,144 also preferably includes a respective outer aperture 154,156 formed through the respective outer segment 146,148 and a respective inner aperture 158,160 formed through the respective inner segment 150,152.

Preferably, the frames 134,136 comprise a magnetically and electrically insulative material such as melamine, polycarbonate, or another synthetic resin, although any one of a variety of materials or mixtures thereof may be used without departing from the scope of the present invention. Furthermore, although two frames are preferred, it is within the scope of the present invention for a single frame or no frame to be used; and the tabs may be configured differently than described above or excluded entirely.

Figure 9:
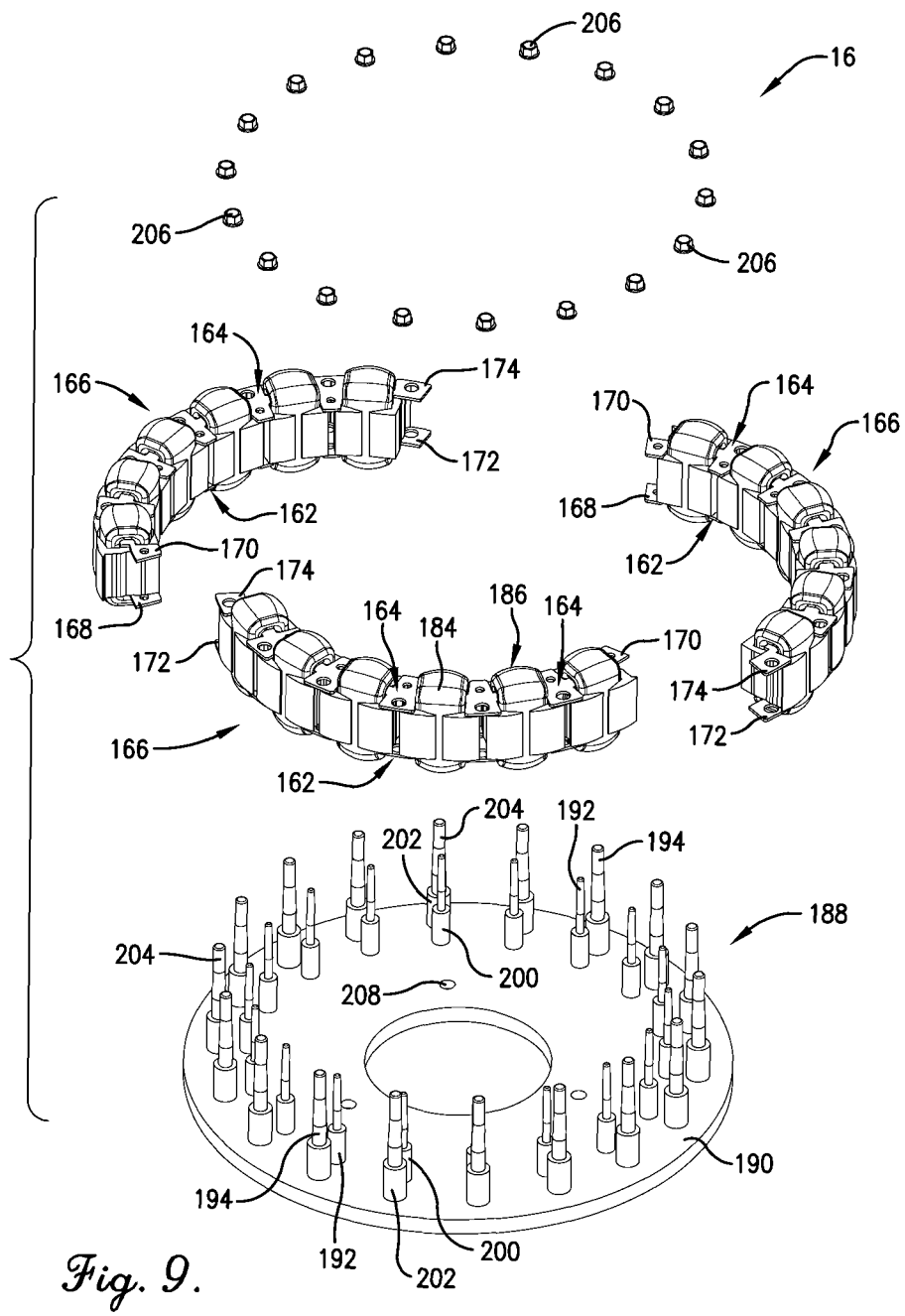
FIG. 9 is an exploded bottom perspective view of the stator and base plate assembly of FIGS. 7 and 8, particularly illustrating the positioning pegs and the arcuate sections that form the stator.

As best shown in FIGS. 9 and 11, each frame 134,136 preferably includes a respective plurality of frame portions 162,164. Each frame portion 162,164 is associated with a corresponding plurality of segments 70, with each frame portion 162,164 and its associated stator segments 70 collectively forming part of an arcuate section 166.

As best shown in FIG. 9, each frame portion 162,164 preferably includes a respective inner engagement protrusion 168,170 and an outer engagement protrusion 172,174, with the engagement protrusions 168,172 and 170,174 being located at circumferentially opposite ends of each frame portion 162,164. As shown in FIG. 11, a respective inner aperture 176,178 is formed through each inner engagement protrusion 168,170; and a respective outer aperture 180,182 is formed through each outer engagement protrusion 172,174. The inner protrusion 168 of each upper frame portion 162 abuts the outer protrusion 172 of the adjacent upper frame portion 162 when the arcuate sections 166 are assembled. Likewise, as shown most clearly in FIG. 7, the inner protrusion 170 of each lower frame portion 164 abuts the outer protrusion 174 of the adjacent lower frame portion 164 when the arcuate sections 166 are assembled.

Each arcuate section 166 is completed through the addition of wiring 184 to form a toroidal coil 186 about each yoke 76, with the wiring 184 and, in turn, the coils 186 passing through the outer and inner wiring pathways 106,108, respectively. The wiring 184 preferably substantially comprises a plurality of electrically conductive wires. Copper wires are preferred, although it is within the scope of the present invention to use other types of wires, such as aluminum wires. The wires may or may not be provided with coatings. In the illustrated embodiments, the coils 186 are shown only schematically. However, in practice, the coils 186 would comprise multiple windings of the wiring 184. As is customary, the wiring 184 is wound around the segments 70 in a particular pattern according to the phasing of the motor 10.

In embodiments utilizing magnetically conductive interconnecting elements (such as the bridges 131), it is preferable that the interconnecting element is present between each pair of segments 70 within a given arcuate section 166; but that no interconnecting element is provided between the segments 70 of a first arcuate section 166 and the segments 70 of a second arcuate section 166. However, it is permissible for an interconnecting element to be present between sections 166, to be present between only some of the pairs of segments 70 within a given section 166, or to be present between other sets of segments 70 within a given section (e.g., non-adjacent pairs of segments 70) without departing from the scope of the present invention.

Preferably, the electric motor 10 is a three-phase electric motor including A-phase, B-phase, and C-phase windings. As shown in FIG. 7, the phasing varies from each coil 186 to the next, with a first coil 186a having A-phase windings, a second coil 186b adjacent the first coil 186a having B-phase windings, and a third coil 186c adjacent the second coil 186b having C-phase windings. The pattern then repeats for the next set of three coils.

When the wiring 184 and, in turn, the coils 186 are energized, a magnetic flux pathway is defined through each segment 70 and the adjacent permanent magnets 22,24. For a given segment 70, the flux pathway extends along the first outer arm portion 78, through one of the outer permanent magnets 22, along the second outer arm portion 82, and through the yoke 76. Another flux pathway extends along the first inner arm portion 80, through one of the inner permanent magnets 24, along the second inner arm portion 84, and through the yokes 76. The flux magnitude is thus greatest in the yoke section 76 of each segment 70 and is greater than could be achieved using a single plurality of permanent magnets, assuming other parameters remain constant.

Ideally, for spaced apart segments 70, magnetic flux would be completely confined to one of the pathways described above, with the maximum flux occurring in the yoke section 76 of each segment 70 and with virtually no flux coupling occurring between adjacent segments 70. It is believed that it may be desirable to attain "perfect magnetic isolation," wherein there is a complete lack of flux coupling between segments. Under normal operational conditions, however, such an ideal is not achieved. Rather, some degree of magnetic flux flows between segments, even if sufficient space is provided such that the coupling is very low or negligible. The degree of flux coupling will largely be dependent on dimensions of the space 132 and the magnetic permeability (as measured in henries per meter, newtons per ampere squared, or an analogue of these) of the air or other gas or fluid that fills the space 132. The geometry and magnetic permeability of any obstructions in the space 132 will also play a role. In the case of segments 70 for which a magnetically conductive interconnecting element or bridge 131 is provided, for instance, the flux coupling magnitude will largely depend on dimensions of the space 132, the magnetic permeability of the air within the space, the cross-sectional area of the bridge, and the magnetic permeability of the bridge. The same holds true even for embodiments utilizing inserts that are generally accepted as not being magnetically conductive, with the magnetic permeability of the inserts being a critical factor.

Preferably, the motor 10 is configured such that a pole-slot combination of ten poles to twelve slots or fourteen poles to twelve slots (or an integer multiplier of one of these pole-slot combinations) is achieved. In the illustrated first embodiment, for instance, eighteen H-shaped stator segments 70 are provided so as to present thirty-six slots, as opposed to the eighteen slots that would conventionally be presented by eighteen stator teeth. Fourteen outer magnets 22 and fourteen inner magnets 24 are provided, as well. The magnets 22,24 are oriented in such a manner as to collectively present forty-two magnetic poles. A total of forty-two magnetic poles is thus provided relative to the thirty-six stator slots, thus achieving the desired fourteen poles to twelve slots ratio. In an alternative embodiment (not shown), thirty magnetic poles and thirty-six stator slots might be provided, in keeping with the also suitable ten poles to twelve slots ratio. Ultimately, any one of an infinite number of pole-slot combinations that meet the preferred pole to slot ratio may be used without departing from the scope of the present invention Although the coils 186 provide one means of securing the frames 134,136 to the segments 70, the frames 134,136 and the segments 70 may be additionally secured using an adhesive such as glue or using other means of additional securement.

As briefly noted above, the frames 134,136 preferably comprise a magnetically and electrically insulative material. Such material selection is desirable for insulation of the stator core 68 from the coils 186 and for minimization of magnetic flux leakage from the core 68. However, although use of the frames 134,136 described above is preferred for provision of insulation, it is within the scope of the present invention for insulation to be provided by other means, including but not limited to powder coating, discrete magnetically and electrically non-conductive tabs or covers, and plastic overmolding.

Appropriate positioning of the segments 70 to form a toroid is preferably facilitated by a base plate 188 including a base 190; a plurality of axially projecting, arcuately spaced inner positioning pegs 192; and a plurality of axially projecting, arcuately spaced outer positioning pegs 194. Preferably, the base 190 includes a plurality of inner and outer openings 196,198, respectively, that correspond to the inner and outer positioning pegs 192,194, with one end of each of the pegs 192,194 being inserted into a corresponding one of the openings 196,198. Although the illustrated embodiment depicts a press fit, it is within the scope of the present invention for the pegs be integral with the base, to screw into the base, to be adhered to the base, or to be connected to the base in any other manner.

When the segments 70 and the frames 134,136 are arranged as part of the assembled stator 16, they are restricted in their lateral movements by the positioning pegs 192,194. More particularly, as best illustrated in FIG. 10, each outer peg 194 preferably extends through a corresponding pair of the upper and lower outer apertures 154,156 or 180,182 and is thereby partially received within the groove 128 of each of the two adjacent segments 70. Similarly, each corresponding inner peg 192 extends through a corresponding pair of the upper and lower inner apertures 158,160 or 176,178 and is thereby partially received within the groove 130 of each of the same two adjacent segments 70.

As best shown in FIG. 9, each of the pegs 192,194 preferably includes a circumferentially enlarged pedestal 200,202, respectively, having a diameter greater than that of the respective apertures 154-160 and 176-182. Furthermore, each of the outer pegs 194 includes an end 204 onto which a nut 206 may be threaded (threads not illustrated). The pedestals 200,202 ensure clearance is provided between the arcuate sections 166 and the base 190 (see, for instance, FIG. 8) in addition to preventing axially upward shifting of the arcuate sections 166. The nuts 206 prevent axially downward shifting of the arcuate sections 166.

In a preferred embodiment, the base 190 includes a plurality of mounting holes 208 formed therethrough. As best shown in FIG. 3, a first plurality of fasteners 210 extend through the mounting holes 208 and into respective lower portions 212 of a plurality of intermediate connectors 214. Each of the intermediate connectors 214 also preferably includes a middle portion 216 defining an abutment region 218 that is positioned flush with the mounting region 12 of the machine after mounting, in addition to an upper portion 220 that is slidably interfitted in respective ones of a plurality of mounting holes 222 formed in the mounting region 12. Mounting is completed upon insertion of a second plurality of fasteners 224 downward through the mounting holes 222 of the mounting region 12 and into openings 226 in the upper portions 220 of the intermediate connectors 214.

In a preferred method of assembly of the stator 16, the frame portions 162,164 are first positioned relative to the associated segments 70 and, if an adhesive or other auxiliary securement means is to be used, secured thereto. Wiring 184 is then wound around the segments 70 and the frame portions 162,164 according to the phasing pattern described previously to complete the arcuate sections 166. The arcuate sections 166 are then placed on the base plate 188 such that the inner and outer positioning pegs 192,194 extend through the apertures 154-160 and 176-182 of the frames 138,140 and between the segments 70, as described previously. The wiring 184 from adjacent arcuate sections 166 is then connected to complete assembly of the stator 16.

A second preferred motor embodiment is illustrated in FIGS. 16-22. It is initially noted that, with certain exceptions to be discussed in detail below, many of the elements of the motor of the second embodiment are the same as or very similar to those described in detail above in relation to the motor 10 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

Figure 16:
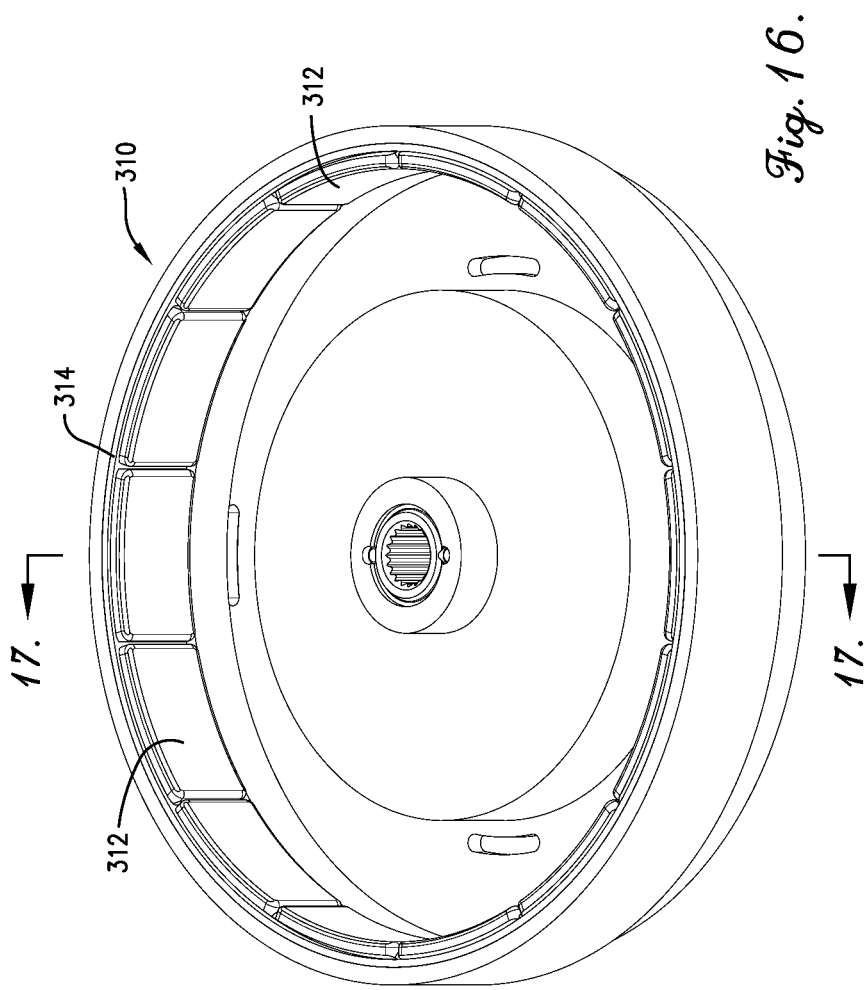
FIG. 16 is a top perspective view of a portion of a rotor constructed in accordance with a second embodiment of the present invention.
Figure 17:
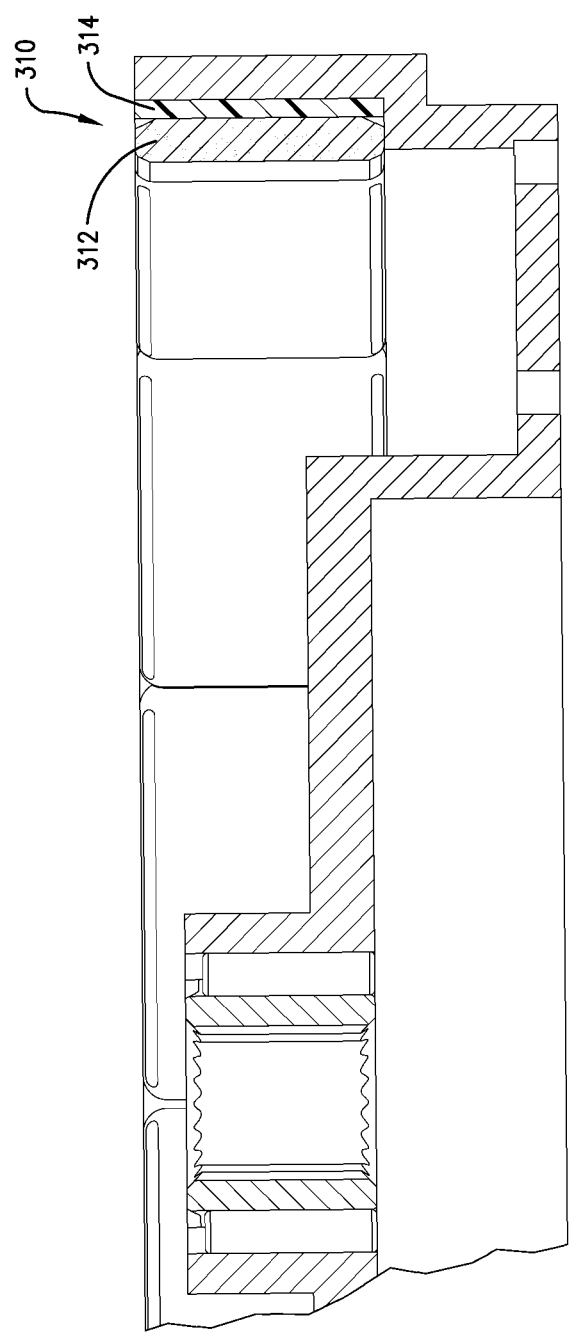
FIG. 17 is a partial sectional view of the portion of the rotor shown in FIG. 16.
Figure 18:
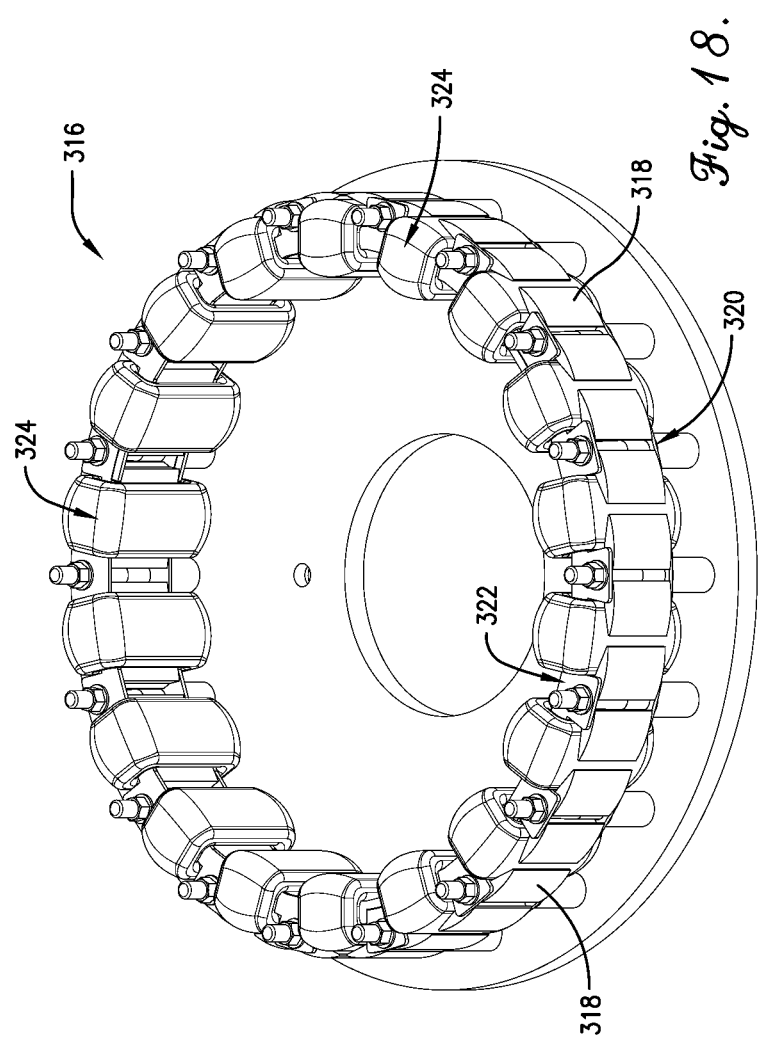
FIG. 18 is an enlarged bottom perspective view of an assembly comprising a stator and base plate constructed in accordance with the second embodiment of the present invention.
Figure 19:
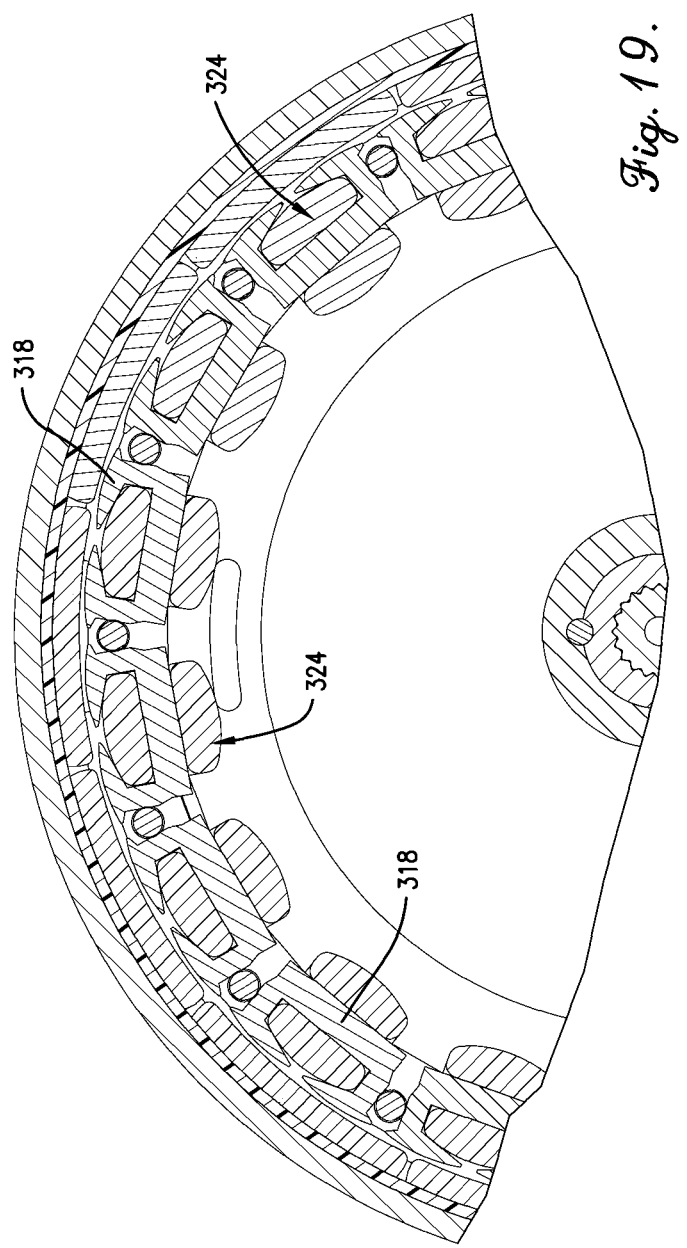
FIG. 19 is a fragmentary sectional top view of the stator and base plate assembly of FIG. 18, particularly illustrating the relationship between the stator segments, the coils, the positioning pegs, and the permanent magnets of the rotor.

Turning now to FIGS. 16 and 17, a rotor can 310 is provided. The rotor can 310 preferably supports an outer plurality of arcuately spaced permanent magnets 312 and an outer backing ring 314. The rotor can 310 is configured for use with a stator 316 such as that shown in FIG. 18. In contrast to the H-shaped segments 70 of the first embodiment, the magnetically isolated segments 318 of the second embodiment have a U-like form best illustrated in FIGS. 20-22. Upper and lower frames 320,322 respectively, are adapted for use with the U-shaped segments 318 and support the segments 318 while also insulating the segments 318 from coils 324. Furthermore, as is also applicable for the H-shaped segments 70 of the first embodiment, adjacent segments 318 may be spaced apart, with an open unobstructed space therebetween, as shown. The segments 70 may alternatively be provided with an obstruction therebetween which either maintains the spaced apart relationship of the adjacent segments or serves as a magnetically conductive interconnecting element (such as a bridge).

Although the illustrated second embodiment depicts an outer rotor configuration, it is within the scope of the present invention for the segments 318 to be oppositely oriented and the plurality of magnets 312 to be provided radially inwardly from the segments 318 such that an inner rotor motor configuration is achieved. Furthermore, the segments 318 may be shaped in a manner deviating from that shown without departing from the scope of the present invention, including the provision of curved or jagged yokes and/or arms as described previously with reference to the H-shaped segments 70 of the first embodiment. Other segment designs with a yoke extending between at least a pair of arms are also within the ambit of the present invention.

A third preferred motor embodiment is illustrated in FIGS. 23-26. It is noted that, with certain exceptions to be discussed in detail below, many of the elements of the motor of the third embodiment are the same as or very similar to those described in detail above in relation to the motor 10 of the first embodiment and/or the motor of the second embodiment. Therefore, for the sake of brevity and clarity, redundant descriptions and numbering will be generally avoided here. Unless otherwise specified, the detailed descriptions of the elements presented above with respect to the first and second embodiments should therefore be understood to apply at least generally to the third embodiment, as well.

Figure 23:
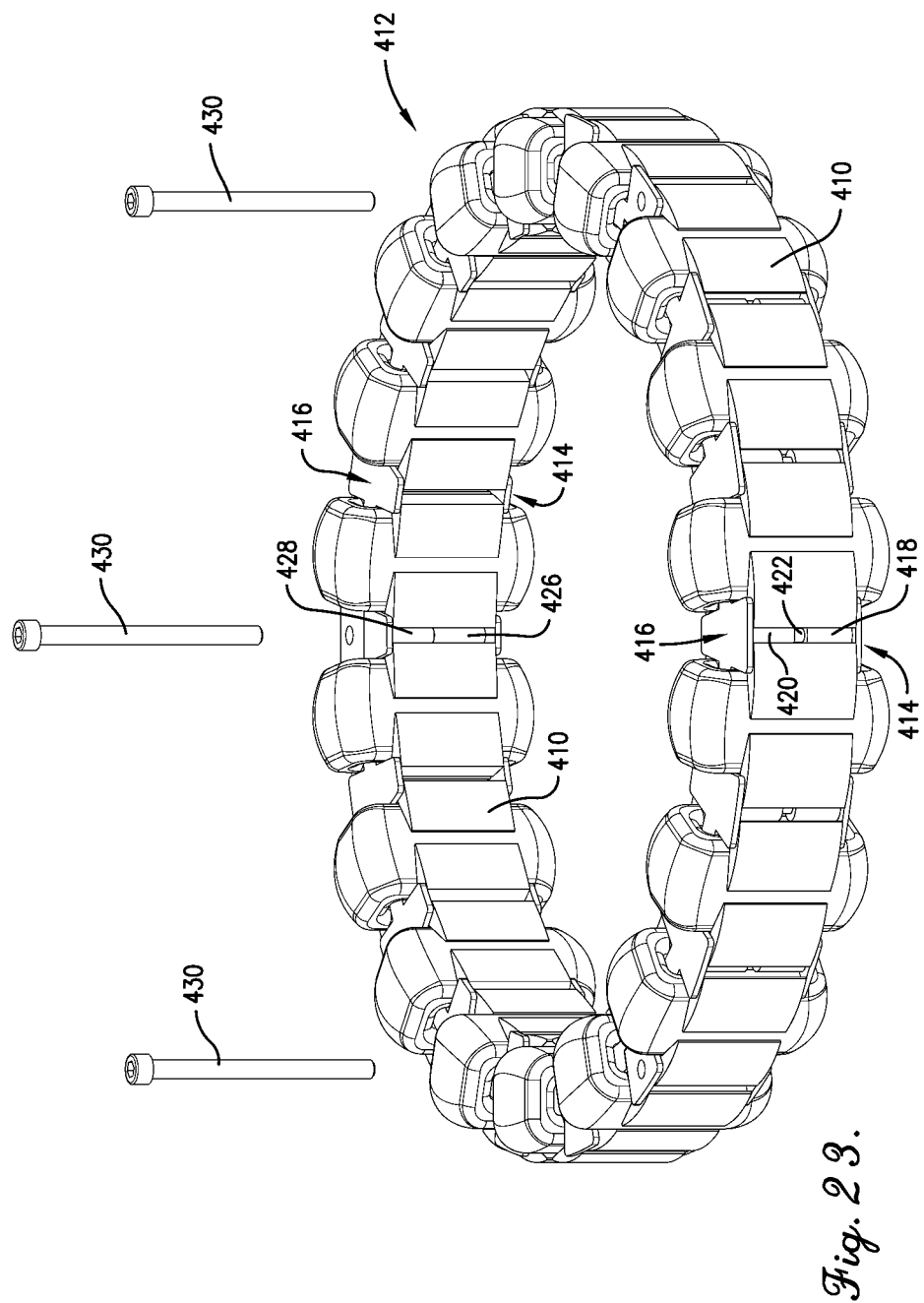
FIG. 23 is a bottom perspective view of a stator constructed in accordance with a third embodiment of the present invention.
Figure 26:
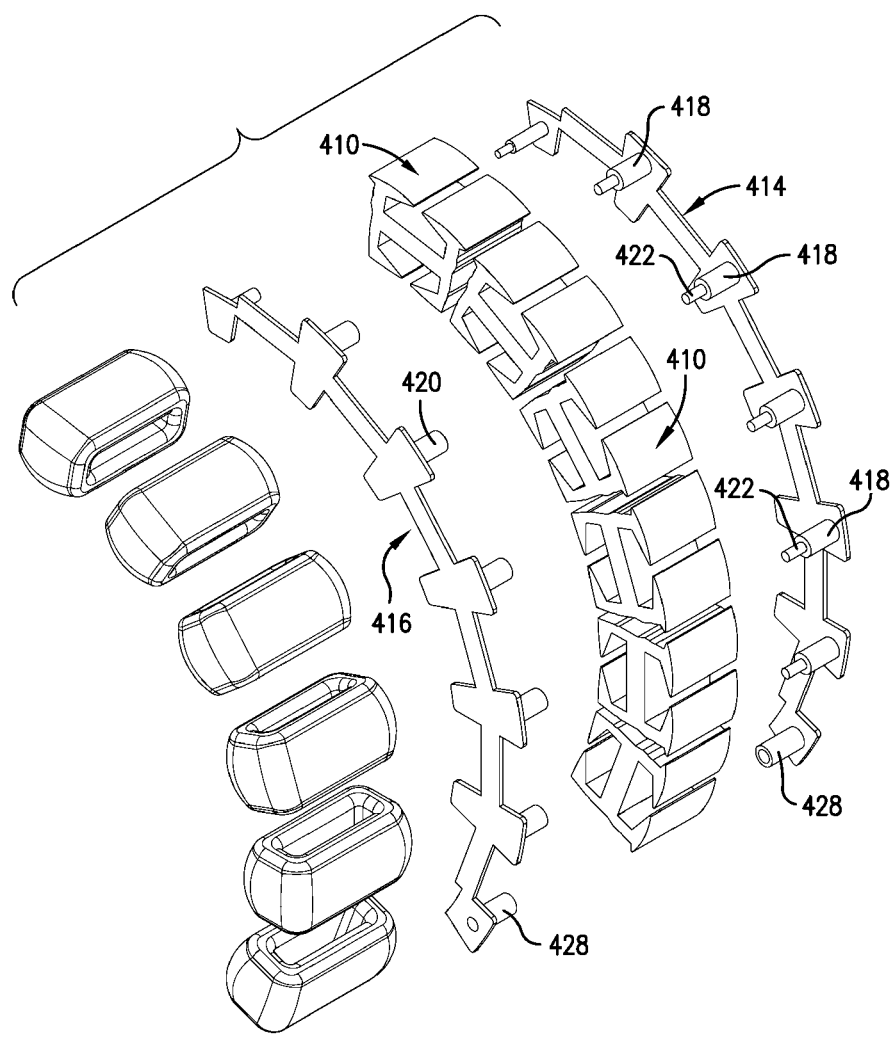
FIG. 26 is an exploded side perspective view of one the arcuate sections of FIG. 24, particularly illustrating the relationship between the segments, the frames, the positioning pegs and projections, and the coils.

Turning initially to FIG. 23, it is clear that the means of appropriately positioning a plurality of stator segments 410 to form a toroid and to mount a stator 412 to the machine are modified relative to those shown for the first and second embodiments. More particularly, an upper frame 414 and a lower frame 416 are provided, with the upper frame 414 including a plurality of arcuately arranged upper positioning pegs 418 and the lower frame 416 including a corresponding plurality of lower positioning projections 420. As shown, in a preferred embodiment, the pegs 418,420 are arranged along a radially outer portion of the respective frames 414,416. However, the pegs could be radially centered on the frames, positioned along a radially inner portion, or positioned in some other manner without departing from the scope of the present invention. Each frame could also include one or more additional pluralities of pegs. For instance, both the upper and lower frames could include respective radially inner and radially outer pluralities of positioning pegs.

Preferably, each of the top pegs 418 includes a constricted region 422 configured to fit within a recess 424 in the respective bottom projection 420, although constricted regions 422 and recesses 424 could also advantageously be located on the bottom projections 420 and top pegs 418, respectively. Furthermore, the pegs could project from the bottom frame, and the projections could extend from the top frame. Even further, the pegs and projections could be identical to each other.

As best shown in FIG. 25, it is preferable that the length of the constricted regions 422 and the depth of the recesses 424 are such that the constricted regions 422 do not bottom out in the recesses 424. Such an embodiment enables flexible accommodation of variations in lamination stack height that may affect the axial dimension of the stator segments 410. However, use of any of a variety of connection means between the pegs 418 and projections 420 or, alternatively, no connection means at all, is within the scope of the present invention.

In addition to providing pegs 418 and projections 420, the frames 414,416 also provide respective mounting structures 426,428 configured to receive and support a plurality of fasteners 430 for mounting the motor 410 onto the machine.

Although the pegs 418 and projections 420, as well as the mounting structures 426,428, may be integrally formed with the respective frames 414,416, it is within the scope of the present invention for the pegs 410, the projections 420, and/or the mounting structures 426,428 to be discrete objects that are attachable to the respective frames 414,416 by any manner known in the art. Furthermore, although the illustrated embodiment utilizes H-shaped stator segments 410, U-shaped or other segments may also be used, as described previously.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention set forth in the following claims.

What is claimed is:

1. A segmented stator for use in a motor, said stator comprising:
 a core comprising a plurality of arcuately arranged, magnetically isolated segments; and
 wiring wound around each of the segments,
 each of said segments including—
  a pair of spaced apart, generally radial arms, and
  a yoke extending between and interconnecting the arms,
  each of said arms including—
   a first arm portion extending generally radially outwardly from the yoke, and a second arm portion extending generally radially inwardly from the yoke,
each of said segments having a substantially H-shaped form.
2. The stator of claim 1,
said wiring being wound around each of the yokes.
3. The stator of claim 1,
each of said arm portions including a radial end and a crown extending from the radial end toward the other similarly extending arm portion.
4. The stator of claim 1,
said arms being substantially parallel.
5. The stator of claim 1,
said segments being arranged to form a plurality of arcuate sections,
said arcuate sections cooperatively forming a toroid.
6. The stator of claim 1,
said segments being spaced apart.
7. The stator of claim 6,
wherein an open unobstructed space is formed between adjacent segments.
8. The stator of claim 1,
said stator including an interconnecting element extending between and connecting a pair of adjacent segments,
wherein the pair of segments and the interconnecting element are configured such that the flux flowing through the interconnecting element is no greater than about 10% of the maximum flux flowing through either one of the pair of segments when the motor is in operation.
9. A segmented stator for use in a motor, said stator comprising:
a core comprising a plurality of arcuately arranged, magnetically isolated segments; and
wiring wound around each of the segments,
each of said segments including—
a pair of spaced apart, generally radial arms, and
a yoke extending between and interconnecting the arms,
said stator further including a base plate including a plurality of axially projecting pegs,
said pegs extending between said segments to position the segments relative to one another.
10. The stator of claim 9,
each of said arms including—
a first arm portion extending generally radially outwardly from the yoke, and
a second arm portion extending generally radially inwardly from the yoke,
each of said segments having a substantially H-shaped form.
11. A segmented stator for use in a motor, said stator comprising:
a core comprising a plurality of arcuately arranged, magnetically isolated segments; and
wiring wound around each of the segments,
each of said segments including—
a pair of spaced apart, generally radial arms, and
a yoke extending between and interconnecting the arms,
each of said segments presenting a radially extending surface,
said stator including a supporting frame that extends along the surface,
said frame extending between the surface and the wiring,
said frame including a plurality of axially projecting pegs,
said pegs extending between said segments to position the segments relative to one another.
12. The stator of claim 11,
each of said segments presenting a second radially extending surface,
said stator including a second supporting frame that extends along the second surface,
said second frame including a plurality of axially projecting projections extending between said segments to position the segments relative to one another,
each of said pegs interengaging with a corresponding one of the projections.
13. The stator of claim 11,
each of said arms including—
a first arm portion extending generally radially outwardly from the yoke, and
a second arm portion extending generally radially inwardly from the yoke,
each of said segments having a substantially H-shaped form.
14. A motor for use in a machine, said motor comprising:
a rotor rotatable about an axis; and
a segmented stator,
said stator including—
a core comprising a plurality of arcuately arranged, magnetically isolated segments, and
wiring wound around each of the segments,
each of said segments including—
a pair of spaced apart, generally radial arms, and
a yoke extending between and interconnecting the arms,
said rotor including a plurality of arcuately arranged permanent magnets positioned radially adjacent the stator to define a circumferential gap between the magnets and the stator,
said rotor including two sets of arcuately arranged magnets,
wherein a first set is positioned radially outside the stator to define an outer circumferential gap between the first set and the stator,
wherein a second set is positioned radially inside the stator to define an inner circumferential gap between the second set and the stator.
15. The motor of claim 14,
said motor including 42 poles and 36 slots,
said stator including 18 segments,
said rotor including 28 permanent magnets.
16. The motor of claim 14,
each of said arms including—
a first arm portion extending generally radially outwardly from the yoke, and
a second arm portion extending generally radially inwardly from the yoke,
each of said segments having a substantially H-shaped form.
17. The motor of claim 14,
said motor having a pole:slot ratio of 14:12, 10:12, or an integer multiple thereof.
18. A motor for use in a machine, said motor comprising:
a rotor rotatable about an axis; and
a segmented stator,
said stator including—
a core comprising a plurality of arcuately arranged, magnetically isolated segments, and
wiring wound around each of the segments,
each of said segments including—
a pair of spaced apart, generally radial arms, and
a yoke extending between and interconnecting the arms, each of said arms including—
  a first arm portion extending generally radially outwardly from the yoke, and
  a second arm portion extending generally radially inwardly from the yoke,
each of said segments having a substantially H-shaped form.

19. The motor of claim 18,
said wiring being wound around each of the yokes.

20. The motor of claim 18,
said motor having a pole:slot ratio of 14:12, 10:12, or an integer multiple thereof.

21. The motor of claim 18,
each of said arm portions including a radial end and a crown extending from the radial end toward the other similarly extending arm portion.

22. The motor of claim 18,
said arms being substantially parallel.

23. The motor of claim 18,
said segments being arranged to form a plurality of arcuate sections,
said arcuate sections cooperatively forming a toroid.

24. The motor of claim 18,
wherein said motor is operable to generate flux that flows through and between each of the segments when the motor is in operation,
wherein the flux flowing between each pair of segments is no greater than about 10% of the maximum flux flowing through either one of the corresponding pair of segments when the motor is in operation.

25. The motor of claim 18,
said segments being spaced apart.

26. The motor of claim 25,
wherein an open unobstructed space is formed between adjacent segments.

27. The motor of claim 18,
said stator including an interconnecting element extending between and connecting a pair of adjacent segments,
wherein the pair of segments and the interconnecting element are configured such that the flux flowing through the interconnecting element is no greater than about 10% of the maximum flux flowing through either one of the pair of segments when the motor is in operation.

28. The motor of claim 18,
said rotor including two sets of arcuately arranged magnets,
wherein a first set is positioned radially outside the stator to define an outer circumferential gap between the first set and the stator,
wherein a second set is positioned radially inside the stator to define an inner circumferential gap between the second set and the stator.

29. A motor for use in a machine, said motor comprising:
a rotor rotatable about an axis; and
a segmented stator,
said stator including—
  a core comprising a plurality of arcuately arranged, magnetically isolated segments, and
  wiring wound around each of the segments,
each of said segments including—
  a pair of spaced apart, generally radial arms, and
  a yoke extending between and interconnecting the arms,
said stator further including a base plate including a plurality of axially projecting pegs,
said pegs extending between said segments to position the segments relative to one another.

30. The motor of claim 29,
each of said arms including—
  a first arm portion extending generally radially outwardly from the yoke, and
  a second arm portion extending generally radially inwardly from the yoke,
each of said segments having a substantially H-shaped form.

31. The motor of claim 29,
said motor having a pole:slot ratio of 14:12, 10:12, or an integer multiple thereof.

32. The motor of claim 29,
said rotor including two sets of arcuately arranged magnets,
wherein a first set is positioned radially outside the stator to define an outer circumferential gap between the first set and the stator,
wherein a second set is positioned radially inside the stator to define an inner circumferential gap between the second set and the stator.

33. A motor for use in a machine, said motor comprising:
a rotor rotatable about an axis; and
a segmented stator,
said stator including—
  a core comprising a plurality of arcuately arranged, magnetically isolated segments, and
  wiring wound around each of the segments,
each of said segments including—
  a pair of spaced apart, generally radial arms, and
  a yoke extending between and interconnecting the arms,
each of said segments presenting a radially extending surface,
said stator including a supporting frame that extends along the surface,
said frame extending between the surface and the wiring,
said frame including a plurality of axially projecting pegs,
said pegs extending between said segments to position the segments relative to one another.

34. The motor of claim 33,
each of said segments presenting a second radially extending surface,
said stator including a second supporting frame that extends along the second surface,
said second frame including a plurality of axially projecting projections extending between said segments to position the segments relative to one another,
each of said pegs interengaging with a corresponding one of the projections.

35. The motor of claim 33,
each of said arms including—
  a first arm portion extending generally radially outwardly from the yoke, and
  a second arm portion extending generally radially inwardly from the yoke,
each of said segments having a substantially H-shaped form.

36. The motor of claim 33,
said motor having a pole:slot ratio of 14:12, 10:12, or an integer multiple thereof.

37. The motor of claim 33,
said rotor including two sets of arcuately arranged magnets, wherein a first set is positioned radially outside the stator to define an outer circumferential gap between the first set and the stator, wherein a second set is positioned radially inside the stator to define an inner circumferential gap between the second set and the stator.

* * * * *